US011188477B2

United States Patent
Oster et al.

(10) Patent No.: US 11,188,477 B2
(45) Date of Patent: Nov. 30, 2021

(54) PAGE PROTECTION LAYER

(71) Applicant: Apple Inc., Cupertino, CA (US)

(72) Inventors: Julien Oster, San Francisco, CA (US);
Thomas G. Holland, Cupertino, CA (US); Bernard J. Semeria, Palo Alto, CA (US); Jason A. Harmening, Santa Clara, CA (US); Pierre-Olivier J. Martel, Mountain View, CA (US); Gregory D. Hughes, San Francisco, CA (US); P. Love Hornquist Astrand, Santa Clara, CA (US); Jacques Fortier, San Francisco, CA (US); Ryan P. Nielson, San Francisco, CA (US); Simon P. Cooper, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 13 days.

(21) Appl. No.: 16/564,502

(22) Filed: Sep. 9, 2019

(65) Prior Publication Data
US 2020/0081847 A1 Mar. 12, 2020

Related U.S. Application Data

(60) Provisional application No. 62/729,896, filed on Sep. 11, 2018.

(51) Int. Cl.
*G06F 12/1009* (2016.01)
*G06F 21/62* (2013.01)
*G06F 9/455* (2018.01)

(52) U.S. Cl.
CPC ...... *G06F 12/1009* (2013.01); *G06F 9/45558* (2013.01); *G06F 21/6218* (2013.01);
(Continued)

(58) Field of Classification Search
CPC ............ G06F 9/45558; G06F 12/1009; G06F 12/1036; G06F 12/1081; G06F 12/109;
(Continued)

(56) References Cited

U.S. PATENT DOCUMENTS 8,578,483 B2 11/2013 Seshadri et al.
9,177,153 B1 11/2015 Perrig et al.
(Continued)

OTHER PUBLICATIONS

Samsung Knox News, "Real-time Kernel Protection (RKP)," Feb. 16, 2016, 7 pages.
(Continued)

*Primary Examiner* — Aracelis Ruiz
(74) *Attorney, Agent, or Firm* — Kowert, Hood, Munyon, Rankin & Goetzel, P.C.; Lawrence J. Merkel

(57) ABSTRACT

In an embodiment, a computer system comprises a page protection layer. The page protection layer may be the component in the system which manages the page tables for virtual to physical page mappings. Transactions to the page protection layer are used to create/manage mappings created in the page tables. The page protection layer may enforce dynamic security policies in the system (i.e. security policies that may not be enforced using only a static hardware configuration). In an embodiment, the page protection layer may ensure that it is the only component which is able to modify the page tables. The page protection layer may ensure than no component in the system is able to modify a page that is marked executable in any process' address space. The page protection may ensure that any page that is marked executable has code with a verified code signature, in an embodiment.

20 Claims, 11 Drawing Sheets

(52) U.S. Cl.
CPC .............. *G06F 2009/45583* (2013.01); *G06F 2212/1052* (2013.01); *G06F 2212/657* (2013.01)

(58) Field of Classification Search
CPC .. G06F 12/145; G06F 12/1491; G06F 21/575; G06F 21/6218; G06F 2009/45583; G06F 2009/45587; G06F 2212/1052; G06F 2212/152; G06F 2212/657; G06F 2212/683
See application file for complete search history.

(56) References Cited

U.S. PATENT DOCUMENTS

| | | | |
|---|---|---|---|
| 9,578,017 B2 | 2/2017 | Ferguson et al. | |
| 2010/0031360 A1* | 2/2010 | Seshadri | G06F 21/57 726/24 |
| 2015/0220455 A1* | 8/2015 | Chen | G06F 21/64 711/163 |
| 2016/0110298 A1 | 4/2016 | Koufaty et al. | |
| 2018/0081830 A1* | 3/2018 | Kaplan | G06F 12/1009 |
| 2018/0330081 A1* | 11/2018 | Hua | G06F 12/1441 |

OTHER PUBLICATIONS

Arvind Seshadri, Mark Luk, Ning Qu, Adrian Perrig, SecVisor: A Tiny Hypervisor to Provide Lifetime Kernel Code Integrity for Commodity OSes, CyLab/CMU, Pittsburgh, PA, USA, Oct. 14-17, 2007, 17 pages.

Mprotect—Setting Memory Permissions—Linux System Calls—InformIT reference is section 8.9 of the following book: Advanced Linux Programming; By=Mark L. Mitchell, Alex Samuel, Jeffrey Oldham; Published Jun. 11, 2001 by Sams, 3 pages.

Mprotect(2)—Linux manual page; https://man7.org/linux/man-pages/man2/mprotect.2.html; Copyright (C) 2007 Michael Kerrisk <mtk.manpages@gmail.com>and Copyright (C) 1995 Michael Shields <shields@tembel.org>, 6 pages.

* cited by examiner

| Command | Description |
|---|---|
| Create Address Space | Create VM space for a process |
| Nest Address Space | Share (part) of an address space |
| Unnest Address Space | Remove shared address space |
| Create Mappings | Map physical page(s) to virtual address(es) |
| Remove Mappings | Unmap virtual address(es) |
| Protect Mappings | Increase protections on set of VA mappings |
| Protect Page | Increase protections on a physical page |
| Activate Address Space | Activate address space on a processor |
| Register Code Directory | Register Code Directory with PPL |
| Unregister Code Directory | Unregister Code Directory with PPL |
| Associate Code Directory | Provide Code Directory for an address space |
| Create JIT Space | Create a JIT region in an address space |
| Take Working Memory | Provide physical pages for PPL use |
| Reclaim Working Memory | Reclaim physical pages from PPL |
| Initialize IOMMU | Create an IOMMU address space |
| IOMMU Create Mapping | Map physical page(s) to virtual address(es) |
| IOMMU Remove Mapping | Unmap virtual address(es) |
| IOMMU IOCTL | Perform I/O Control Command |

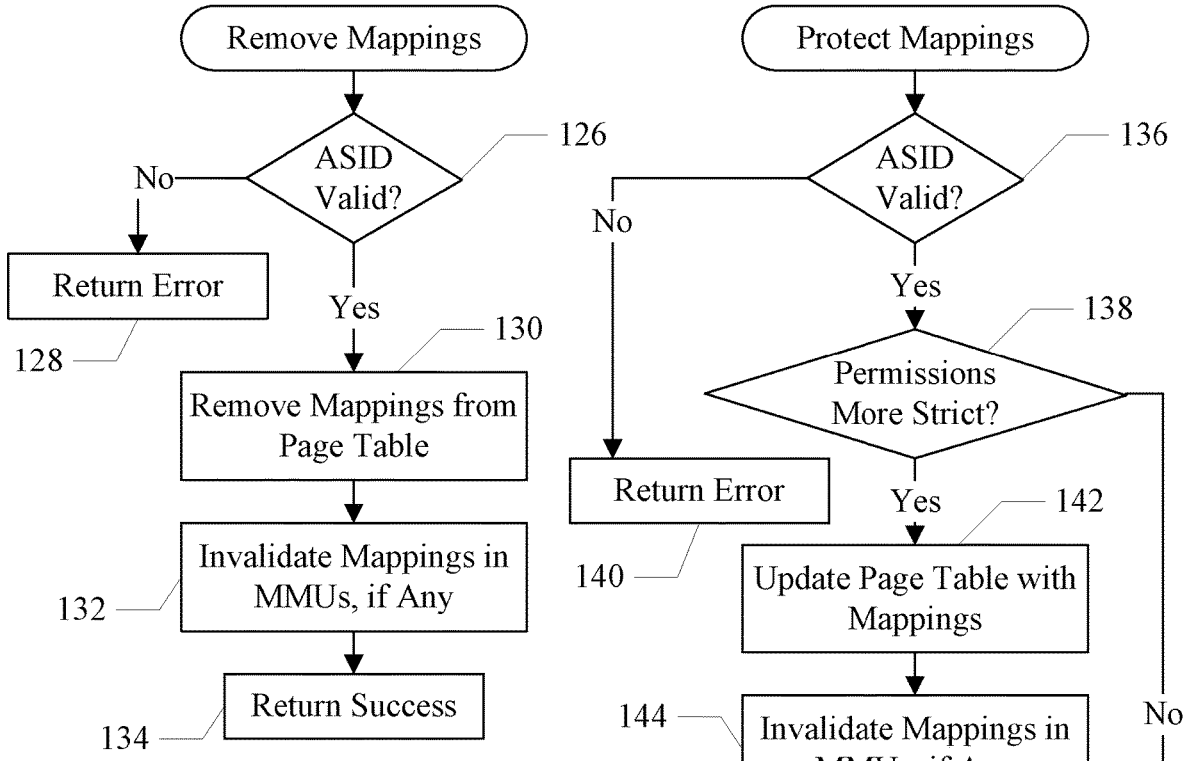
Fig. 8
Fig. 9
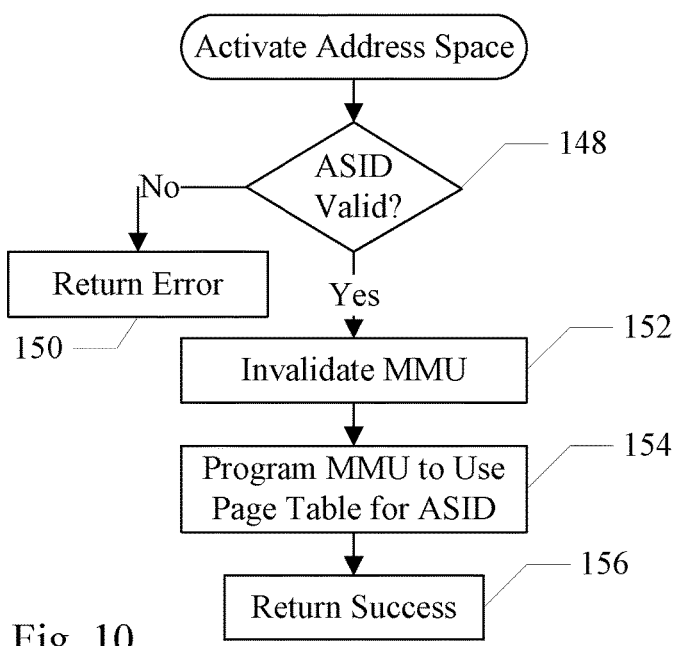
Fig. 10

PAGE PROTECTION LAYER

This application claims benefit of priority to U.S. Provisional Patent Application Ser. No. 62/729,896, filed on Sep. 11, 2018. The above application is incorporated herein by reference in its entirety. To the extent that anything in the above application conflicts with the material expressly set forth herein, the material expressly set forth herein controls.

BACKGROUND

Technical Field

Embodiments described herein are related to computer systems and, more particularly, to security and trusted computing bases in computer systems.

Description of the Related Art

Computer systems have evolved into many different form factors and levels of portability. Generally, computer systems include traditional desktops, servers, large multi-user systems such as mainframes, laptops, tablet computers, personal digital assistants, smart phones, etc. Computer systems normally include controlling software (e.g. an operating system, or portions of the operating system such as a kernel) that controls the operation of other software such as application programs and less privileged parts of the operating system. The controlling software executes at a higher privilege level than the other software and is generally responsible for ensuring the isolation of the other software from each other so that the execution of one software component does not interfere with, or cause erroneous operation of, another software component.

Computer systems and the software executing thereon have various vulnerabilities that can be exploited by a nefarious third party (an "attacker") to compromise the system. Generally, the vulnerabilities may be used to permit the attacker to read arbitrary virtual memory address, write arbitrary values to arbitrary virtual memory addresses, and/or modify control flow to jump to arbitrary virtual addresses that are marked as executable. The vulnerabilities may allow the attacker to take control of a system, obtain secrets such as cryptographic keys, corrupt data on the system causing erroneous operation, etc.

The security structure of the controlling software is designed to mitigate the vulnerabilities so as to reduce the likelihood of successful attack. One such approach is the creation of a trusted computing base (TCB). The TCB is a combination of hardware, firmware, and software that implements a security policy of the computer system to prevent the vulnerabilities that permit an attacker to compromise the computer system. That is, correct enforcement of the security policy prevents the occurrence of vulnerabilities so that the attacker is unable to cause the system to read, write, or execute at arbitrary virtual addresses.

The components of the TCB must generally be proven (formally or through careful analysis) to have a correct implementation as part of ensuring that the system is secure. A failure in any part of the TCB to enforce the security policy can lead to the loss of security in the system. The necessity to ensure correctness of the TCB in practicality generally leads to the requirement that the TCB be as minimal as possible. The more complex and "larger" the TCB becomes, the more likely it is that some part of the TCB is not correctly implemented.

One approach to creating a TCB is to implement a "hypervisor" that executes at a higher privilege level than the kernel and which enforces isolation between kernel components so that an incorrect implementation of one component is contained to that component. While such an approach can be effective, it requires an additional level of privilege in the system. Privilege refers to a level of control that a software component has over a system. Components with higher privilege have more ability to control the system that components with lower privilege. The lowest level of privilege in a system is usually held by the application programs which execute on the system as well as the non-kernel parts of the operating system. The components at the lowest level of privilege have the least control of the system and rely on the higher-privileged components to provide the system resources needed to execute (e.g. system memory, access to peripheral devices, etc.). Increasing the number of privileged levels in the system may complicate the system and thus can increase the potential for a vulnerability.

SUMMARY

In an embodiment, a computer system comprises a TCB that includes a secure boot and a page protection layer. The page protection layer may be the component in the system which manages the page tables for virtual to physical page mappings. Other components (e.g. the kernel virtual memory system) may determine what the virtual to physical page mappings should be, but may then use transactions to the page protection layer to have the mappings created in the page tables. The page protection layer may enforce dynamic security policies in the system (i.e. security policies that may not be enforced using only a static hardware configuration). In an embodiment, the page protection layer may ensure that it is the only component which is able to modify the page tables. The page protection layer may ensure that no component in the system is able to modify a page that is marked executable in any process' address space. The page protection may ensure that any page that is marked executable has code with a verified code signature, in an embodiment.

BRIEF DESCRIPTION OF THE DRAWINGS

The following detailed description makes reference to the accompanying drawings, which are now briefly described.

FIG. 3 is a table of commands supported by one embodiment of the PPL.

FIG. 8 is a flowchart illustrating operation of one embodiment of the PPL for a remove mappings command.

FIG. 9 is a flowchart illustrating operation of one embodiment of the PPL for a protect mappings command.

FIG. 10 is a flowchart illustrating operation of one embodiment of the PPL for an activate address space command.

Figure 1:
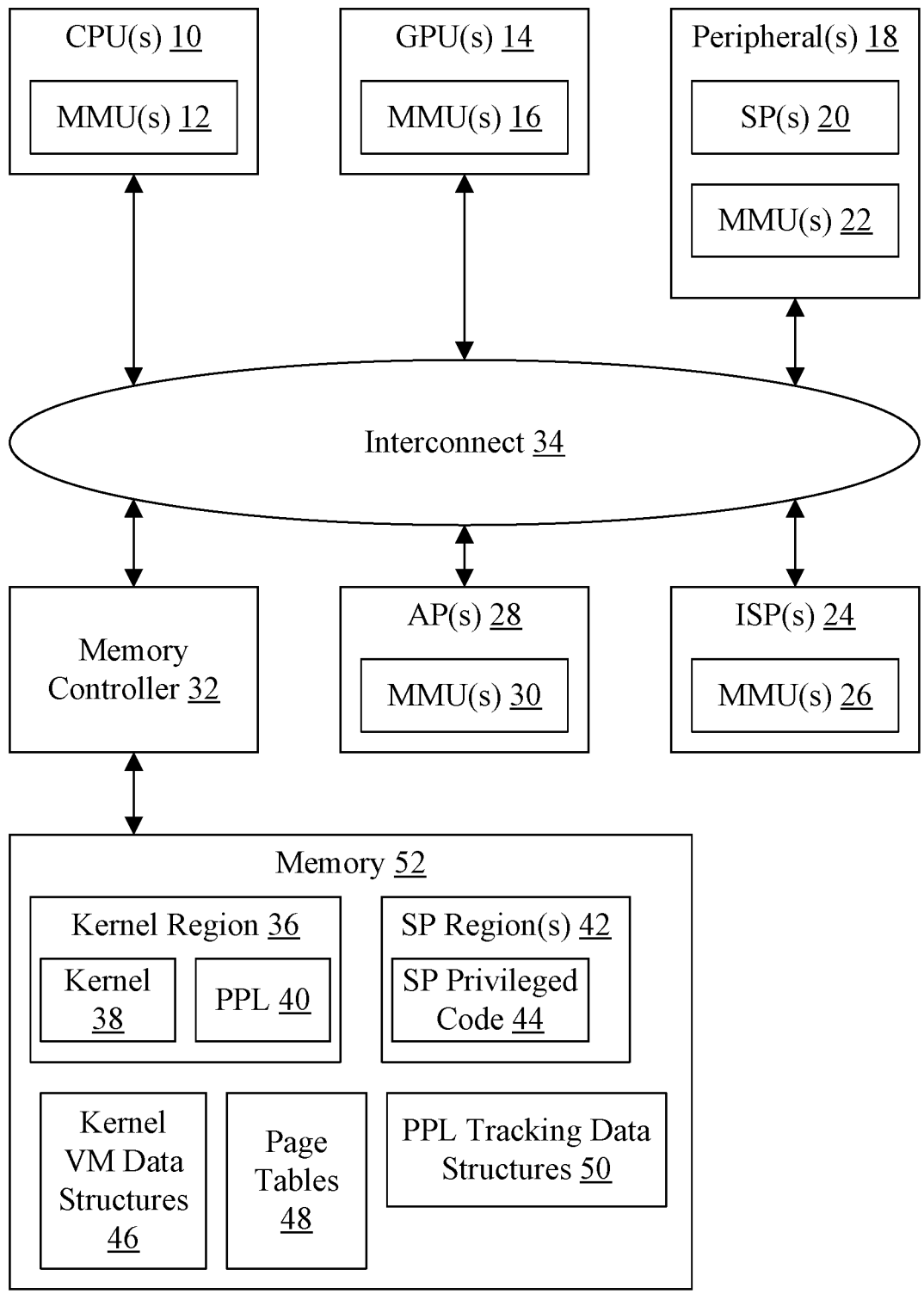
FIG. 1 is a block diagram of one embodiment of a system.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to. As used herein, the terms "first," "second," etc. are used as labels for nouns that they precede, and do not imply any type of ordering (e.g., spatial, temporal, logical, etc.) unless specifically stated.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible. In general, the circuitry that forms the structure corresponding to "configured to" may include hardware circuits. The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims a unit/circuit/component or other structure that is configured to perform one or more tasks is expressly intended not to invoke 35 U.S.C. § 112(f) interpretation for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

As used herein, the term "based on" or "dependent on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

DETAILED DESCRIPTION OF EMBODIMENTS

FIG. 1 is a block diagram of one embodiment of computer system. In the embodiment of FIG. 1, the computer system includes one or more central processing units (CPUs) 10 which may include memory management units (MMUs) 12, one or more GPUs 14 which may include MMUs 16, one or more peripheral components ("peripherals") 18 which may include one or more service processors (SPs) 20 and/or one or more MMUs 22, one or more image signal processors (ISPs) 24 which may include one or more MMUs 26, one or more audio processors (APs) 28 which may include one or more MMUs 30, a memory controller 32, a memory 52, and an interconnect 34. The CPUs 10, GPUs 14, peripherals 16, ISPs 22, APs 26, and memory controller 30 may be coupled to the interconnect 34. The memory controller 30 is coupled to the memory 52. In an embodiment, the components of the computer system other than the memory 52 may be integrated onto a single semiconductor substrate as a system on a chip (SOC). The memory 52 may be coupled to the SOC in any desired fashion. For example, the memory 52 may be mounted on the SOC in a package on package or chip on chip configuration, may be provided in a multichip module solution with the SOC, or may be attached to a circuit board. Other embodiments may use other levels of integration and/or discrete circuits.

In the illustrated embodiment, the memory 52 may have, during use, a kernel region 36, which may include a kernel 38 and a page protection layer (PPL) 40. The memory 52 may have, during use, one or more SP regions 42 which may include SP privileged code 44. The memory 52 may store, during use, various data structures such as kernel VM data structures 46, page tables 48, and PPL tracking data structures 50.

The MMUs 12, 16, 22, 26, and 30 may provide address translation for accesses to the main memory system (e.g. the memory 52 in this example). That is, components in the system that access memory may generally do so through an MMU that translates the addresses, so that memory protection may be observed. The MMUs 12, 16, 22, 26, and 30 may be of different constructions, sizes, organizations, etc., depending on the performance needs of the corresponding components, the size of the memory that may be accessed by the components, etc.

For example, the MMUs that are associated with processors may implement the MMU function of the instruction set architecture implemented by that processor. The MMUs may include translation lookaside buffers (TLBs) and the like which may cache recently used translations for rapid access. The MMUs may include page walking hardware that searches the page tables that are accessible to the processor to locate a translation for a given address (and/or to fault if no valid translation is found or if the translation does not permit the operation, based on permissions associated with the translation). Other MMUs may be used as well. For example, a peripheral 18 that accesses memory but that does not have an associated SP 20 may implement an MMU that is designed for the peripheral. Such an MMU may vary from the MMUs that are associated with processors. MMUs for peripherals may be also be referred to herein as IOMMUs. In some cases, a peripheral may implement an industry standard which may include a specific IOMMU construction. Such IOMMUs may be supported in the system as well.

In an embodiment, each component which accesses the memory 52 may have an MMU to control access and ensure memory protection. In another embodiment, if a component has access to memory (i.e. the component may send memory read/write operations over the interconnect 34 to the memory controller 32) and the component does not have an MMU, the component may implement a PPL that is a slave to the PPL 40. The slave PPL may obtain pages that the component may access from the PPL 40, which may ensure that the pages are not mapped to another process or component in the system.

To enhance the security of the system, the PPL 40 may be responsible for managing the MMU hardware and the mappings of virtual addresses to physical addresses. That is, even the kernel 38 outside of the PPL 40 may not directly manipulate the mappings. The PPL 40 may implement a transaction interface to the kernel 38 (and more particularly the virtual memory manager (VM) in the kernel 38) so that the PPL 40 may not rely on information from the kernel 38 other than the information provided in a given request in order to complete the given request. The kernel VM may manage the virtual memory system (determining which virtual addresses will map to which physical addresses), but may rely on the PPL 40 to actually create the mappings. The PPL 40 may enforce security across the mappings to prevent or limit the vulnerability of the memory system to attack. Because the PPL 40 is relatively small and well contained, it may be more feasible to ensure that the PPL 40 lacks vulnerability and thus may be incorporated in the TCB of the system (e.g. along with secure boot code, not shown in FIG. 1, which ensures that the system is properly initialized while hardening the system to attack).

More particularly, in one embodiment, the PPL 40 may enforce the following properties with regard to pages in the memory 52: No system agent except the PPL 40 may modify the page tables 48; no system agent may modify a physical page that is mapped executable in the address space of any process running on the CPU(s) 10; and no page is mapped as executable in an address space without having a valid code signature authorizing execution in that address space. In one embodiment, an exception to the last rule may be made for a just in time (JIT) region in for an entitled process, as discussed in more detail below. JIT regions may only be permitted in carefully-controlled circumstances so that the exception is limited. Similarly, in an embodiment, an exception to the second rule (regarding modification of pages mapped as executable) may be made in carefully-controlled circumstances to permit debugging. Executable pages may need to be modified to insert breakpoints and other debug features in the code.

The PPL 40 may have various data structures to track pages that are in use, pages available for allocation, etc. The PPL tracking data structures 50 may be the data structures, for example. Similarly, the kernel 38 may have various data structures to track the VM system, illustrated and the kernel VM data structures 46 in FIG. 1.

As used herein, an address space may refer to a range of addresses that a given process may use. The address space may be virtual and may be protected from access/modification by other processes using the virtual memory system controlled by the VM and the mappings to physical pages controlled by the PPL 40. That is, each process may have its own address space. The address space may be assigned a "handle" or identifier (ID), referred to as an address space ID (ASID). The ASID may be part of the context of the process, so that when the process is in execution on a CPU 10, the ASID is loaded into the CPU 10 and becomes part of the CPU 10's access to the MMUs 12. A page table may refer to the set of virtual address to physical address mappings that have been created for a given address space. Each address space may have a page table associated with it, which is managed by the PPL 40. The page table may include the mappings, as well as various permissions that have been allocated to each mapping (e.g. read, write, and execute permissions). A page may be the granule at which mappings are managed (i.e. the page may be the size at which a mapping is created, and offsets within the virtual page of a given mapping map correspond to offsets within the physical page to which the virtual page is mapped). That is, each address in the virtual page maps to an address in the physical page through the same mapping. Various embodiments may implement different page sizes. For example, 4 kilobytes (kB) is one page size implemented in various virtual memory systems. Other sizes may be larger or smaller (e.g. 8 kB, 16 kB, 1 megabyte (MB), 2 MB, 4 MB, etc. have been used). Any page size may be supported, and different processors in the system may use different page sizes, as desired.

As mentioned previously, the kernel VM may be responsible for managing the virtual to physical page assignments. The kernel VM may not actually install the page assignments in the page tables 48, but instead may communicate with the PPL 40 to create the mappings. The PPL 40 may ensure that the security requirements for mapping the page are met, and either fail the mapping if there is an error or return success after creating the mapping in the page tables 48. Viewed in another way, the PPL 40 determines whether or not the updates to the page tables are permissible; prevents the updates that are not permissible; and performs the updates that are permissible. Other commands may similarly be terminated if they are not permissible or performed if they are permissible.

The kernel region 36 may be a protected region in the memory 52 that may be created using one or more specific control registers in the CPU(s) 10 (or specific control registers in the system that are writeable by the CPU(s) 10). The specific control register that defines the kernel region may be referred to as the kernel text region register (KTRR). In an embodiment, for example, the KTRR may be located in the memory controller 32 or may be accessible to the memory controller 32 to ensure that write operations sourced anywhere in the system are not permitted in the kernel region 36. The KTRR maybe a write-once register. That is, once the KTRR has been written with data defining the region 36, the KTRR may not be written again without powering off the system and reinitializing the system (i.e. "rebooting" the system). The secure boot mechanism may be invoked during initialization, and may ensure that the kernel 38 and the PPL 40 are loaded into the memory 52 (and may ensure the code is properly signed and perform other security checks) in a memory region and then may write the KTRR to protect the kernel region 36.

Similarly, various service processors (SPs) such as the SPs 20 and or other processors such as the GPUs 14, the ISPs 24, and/or the APs 28 may execute privileged code 44, which may be similar to the kernel 38 but not executed on the CPUs 10. The SP privileged code 44 may also be loaded by the secure boot, and may be protected in an SP region 42. There may be multiple SP regions 42 for multiple privileged code 44. Additionally, in some embodiments, the SP privileged code 44 may be stored in a local memory in the component that has the SP, and the local memory controller may enforce the SP region 42. One or more additional control registers similar to the KTRR may be used to define the SP region(s) 42 and protect the region(s) from writing. The additional control registers may be write-once registers similar to the KTRR.

The various processors in the computer system (CPUs 10, GPUs 14, SPs 20, APs 28, and ISPs 24) may generally be capable of executing instructions from the instruction set defined by an instruction set architecture implemented by those processors. Different processors may implement different instruction set architectures. For example, the CPUs 10 may implement a general purpose instruction set architecture, whereas the GPUs 14 may implement an instruction set architecture that is targeted at graphics processing workloads (e.g. rendering, texturing, etc.). Similarly, the ISPs 24 may implement an instruction set architecture that is targeted at image processing. Alternatively, the ISPs 24 may be hardware implementations that do not have an instruction set, or may be a hybrid hardware/processor design. The APs 28 may implement an instruction set architecture targeted at audio processing. The SPs 20 may also implement a general purpose instruction set architecture, since the SPs 20 are typically provided to assist the peripherals 18 in accessing memory and/or performing other general computing assistance. In an embodiment, the SPs 20 may implement the same instruction set architecture as the CPUs 10, although the SPs 20 need not be the same design. For example, the SPs 20 may be designed to one or more power efficient operating points that are sufficient for the tasks to be performed by the SPs 20, while the CPUs 10 may be designed to one or more higher performance operating points. In an embodiment, one or more special purpose processors such as the GPUs 14, the ISPs 24, and/or the APs 28 may include SPs 20 to handle general purpose tasks that may be inefficient to perform in the special purpose instruction sets (or may not even be possible to perform).

The peripherals 18 may be any type of peripheral components and/or controllers for peripheral interfaces. For example, the peripherals 18 may be any set of additional hardware functionality included in the system. In an embodiment, the peripherals 18 may include video peripherals such as the ISP(s) 24, which may be configured to process image capture data from a camera or other image sensor, display controllers configured to display video data on one or more display devices, the GPU(s) 14, video encoder/decoders, scalers, rotators, blenders, etc. The peripherals 18 may include audio peripherals such as the AP(s) 28, microphones, speakers, interfaces to microphones and speakers, audio processors, digital signal processors, mixers, etc. The peripherals 18 may include interface controllers for various interfaces including interfaces such as Universal Serial Bus (USB), peripheral component interconnect (PCI) including PCI Express (PCIe), serial and parallel ports, etc. The peripherals may include networking peripherals such as media access controllers (MACs). The peripherals 18 may include devices for various types of wireless communication, such as wifi, Bluetooth, cellular, global positioning system, etc. The peripherals 18 may also include additional storage, including RAM storage, solid state storage, or disk storage (e.g. magnetic or optical). The peripherals 18 may include user interface devices such as a display screen, including touch display screens or multi-touch display screens, keyboard or other input devices, etc.

The memory controller 32 may generally include the circuitry for receiving memory operations from the other components of the system and for accessing the memory 52 to complete the memory operations. The memory controller 32 may be configured to access any type of memory 52. For example, the memory 52 may be static random access memory (SRAM), dynamic RAM (DRAM) such as synchronous DRAM (SDRAM) including double data rate (DDR, DDR2, DDR3, DDR4, etc.) DRAM, RAMBUS DRAM, etc. Low power/mobile versions of the DDR DRAM may be supported (e.g. LPDDR, mDDR, etc.). The memory 52 may include one or more memory modules to which the memory devices are mounted, such as single inline memory modules (SIMMs), dual inline memory modules (DIMMs), etc. Alternatively, the memory 52 may include one or more memory devices that are mounted on an IC that includes the other components on the system (e.g. an SOC) in a chip-on-chip or package-on-package implementation.

The memory controller 32 may include queues for memory operations, for ordering (and potentially reordering) the operations and presenting the operations to the memory 52. The memory controller 32 may further include data buffers to store write data awaiting write to memory and read data awaiting return to the source of the memory operation. In some embodiments, the memory controller 32 may include a memory cache to store recently accessed memory data. In SOC implementations, for example, the memory cache may reduce power consumption in the SOC by avoiding reaccess of data from the memory 52 if it is expected to be accessed again soon. In some cases, the memory cache may also be referred to as a system cache, as opposed to private caches such as the L2 cache or caches in the processors, which serve only certain components. Additionally, in some embodiments, a system cache need not be located within the memory controller 32.

The interconnect 34 may be any communication interconnect/fabric and protocol for communicating among the components of the system. The interconnect 34 may be bus-based, including shared bus configurations, cross bar configurations, and hierarchical buses with bridges. The interconnect 34 may also be packet-based, and may be hierarchical with bridges, cross bar, point-to-point, or other interconnects.

The computer system shown in FIG. 1 may be any type of computer system, such as desktops, servers, large multi-user systems such as mainframes, mobile devices (e.g. laptops, tablet computers, personal digital assistants, smart phones, etc.), etc. Various embodiments may include any combination or subcombination of the components illustrated in FIG. 1, and/or any additional components, as desired.

Figure 2:
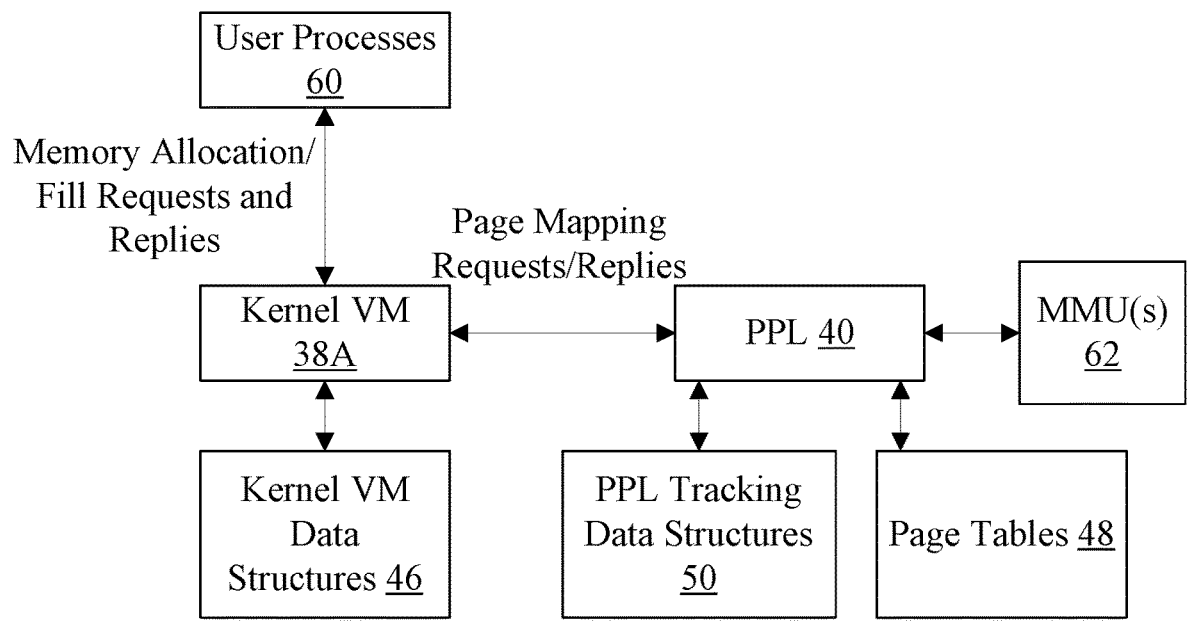
FIG. 2 is a block diagram of one embodiment of a user process, a kernel virtual memory manager (VM), a page protection layer (PPL), and a memory management unit (MMU).

Turning next to FIG. 2, a block diagram of one embodiment of one or more user processes 60, the kernel VM 38A (which may be part of the kernel 38), the PPL 40, and various MMUs 62 (which may include the MMUs 12, 16, 22, 26, and/or 32 shown in FIG. 1) is shown, illustrating certain communications therebetween according to one embodiment. The kernel VM data structures 46, page tables 48, and PPL tracking data structures 50 are also shown.

The user processes 60 may communicate with the kernel VM 38A, requesting memory allocation and memory fills and receiving responses to those requests. The kernel VM 38A may track virtual memory allocations and other virtual memory system data in the kernel VM data structures 46, and may communicate page mapping requests (and other page management transactions) to the PPL 40 and receive replies thereto from the PPL 40. The PPL 40 may manage the page tables 48 and track other data in the PPL tracking data structures 50, and may manage the MMUs 62 as well.

FIG. 3 is a table 64 illustrating various commands that may be supported by one embodiment of the PPL 40. Each command may be a transaction, in an embodiment in which the information provided with the command includes all information that the PPL 40 may require to complete the command. The PPL 40 may attempt the operation, and may terminate the transaction by returning a response to the VM kernel 38A. The response may either be an error response (if an error has been detected), in which case the transaction was not performed (even if a portion of the transaction could have been successfully completed), or a success response (transaction is completed). In either response, the PPL 40 may return control to the VM kernel 38A for further processing.

Most of the commands illustrated in FIG. 3 are described in greater detail with regard to flowcharts shown in FIGS. 4-18. Accordingly, the discussion of FIG. 3 and the discussion of FIGS. 4-18 are interleaved below as each command is discussed. The blocks in the flowcharts of FIGS. 4-18 are shown in a particular order for ease of understanding, but other orders may be used. The PPL 40 may include instructions which, when executed on a processor such as one of the CPUs 10, may cause the system to implement the operation shown in the corresponding flowchart. Other embodiments may support additional commands, subsets of the commands and additional commands, etc.

The twelve initial commands/transactions in the table 64 may deal with managing "normal" memory pages. That is, the memory pages may be pages of the memory 52, and thus access to the pages may be performed by accessing the corresponding locations in the memory 52 (although accesses may be completed in various caches, if equipped). Other pages may be memory-mapped input/output (MMIO) pages that access peripheral devices such as the peripherals 18 (and more particularly, registers in the peripherals, which may be mapped to various offsets within an MMIO page). The mappings of the MMIO pages may also be managed by the PPL 40, as discussed in more detail below. The last 4 commands in the table 64 may be related to MMIO pages as well as memory pages that are mapped by an IOMMU. The 2 commands between the normal memory commands and the MMIO commands ("take working memory" and "reclaim working memory") may relate to exchanging physical pages between the PPL 40 and the kernel VM 38A. The exchanged physical pages are to be used by the PPL 40 for its own working space (e.g. to store the PPL tracking data structures 50).

As mentioned previously, the address space for a process may be identified by an ASID. Accordingly, transactions may generally include a check that the ASID is valid, as illustrated in the flowcharts. Other error checks may also be performed, some of which are illustrated in the flowcharts. Some error checks are not illustrated in the flowcharts. For example, if there is not enough memory to complete a command (e.g. in the PPL tracking data structures 50), then the command may fail. If a failure response (or error response) is given for a command, the PPL 40 may indicate a failure reason as well so that the VM kernel 38A may determine the cause of the failure and take corrective action, if appropriate.

Figures 4, 5:
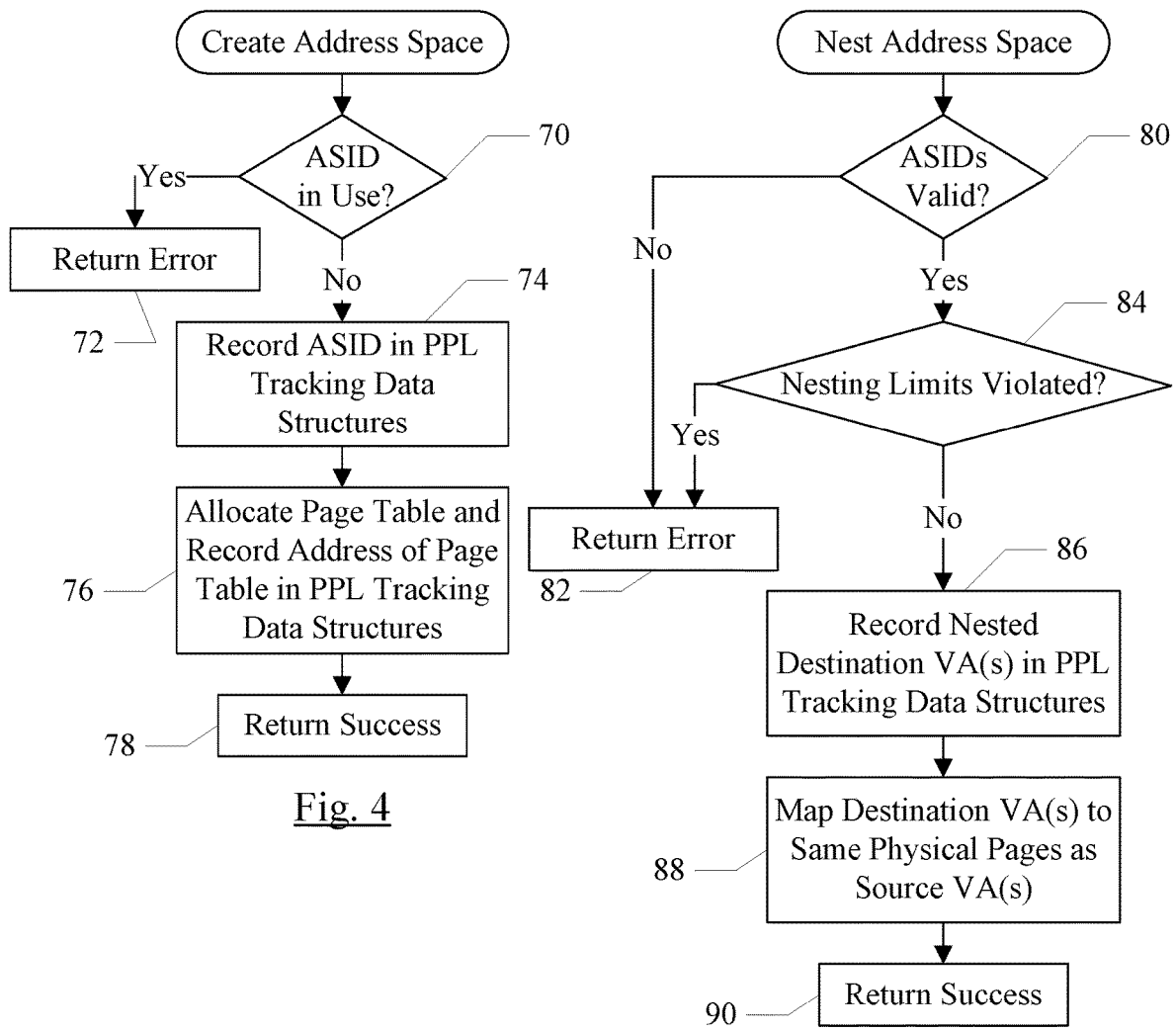
FIG. 4 is a flowchart illustrating operation of one embodiment of the PPL for a create address space command.
FIG. 5 is a flowchart illustrating operation of one embodiment of the PPL for a nest address space command.

The create address space command may be used to provide the ASID of a new address space that the PPL 40 is to begin tracking (e.g., a new process may be starting and may have an address space assigned to it). FIG. 4 illustrates operation of one embodiment of the PPL 40 in response to the create address space command. The PPL 40 may check whether or not the ASID is already in use (e.g. by another process). The ASID is required to be unique for each address space so that the address spaces may be kept isolated (except for intentional nesting, described below). The PPL 40 may track ASIDs which are in use in the PPL tracking data structures 50, for example. If the ASID is already in use (decision block 70, "yes" leg), the PPL 40 may return an error response (block 72). If the ASID is not in use (decision block 70, "no" leg), the PPL 40 may record the ASID in the PPL tracking data structures 50 (block 74) and may allocate a page table for the ASID within the page tables 48 (block 76). Alternatively, the PPL 40 may wait to allocate a page table for the ASID until the VM kernel 38A attempts to create mappings in the address space. The page table may initially have no contents, but may have reserved space in the page tables area so that subsequent requests to create mappings may have a location in which the mappings will be created. The PPL 40 may record the address of the page table in the PPL tracking data structures 50. The PPL 40 may return a success response to the kernel 38A and terminate the command (block 78). In an embodiment, the PPL 40 may check the page tables 48 for space to allocate a page table for the ASID, and may return an error response indicating no space in the page tables 48 for the address space if there is no space for the page table in the page tables 48, prior to allocating the page table in the pages tables 48.

The nest address space command may be used to share a portion of an address space allocated to a source ASID in the address space of a destination ASID. For example, shared libraries may be mapped into a process' address space by nesting the pages containing the shared libraries in the process' address space. Such a configuration may conserve memory space when the same libraries are used in numerous processes. Additionally, a shared cache for data may be created between two processes by nesting the address space of the shared area from one process into the other process. The nest address space command may include source and destination ASIDs, as well as an indication of the address range to be nested from the source virtual address space. For example, the nest address space command may specify the source virtual address and number of pages beginning at the source virtual address to nest in the destination address space. The address range may be specified by a start virtual address and end virtual address, as another example. The nest address space command may also specify a destination virtual address at which the nested pages should be located.

FIG. 5 illustrates the operation of one embodiment of the PPL 40 for the nest address space command. The PPL 40 may validate the ASIDs by checking that they have both been previously created using create address space commands, and thus are in the PPL tracking data structures 50 (decision block 80) and may return an error response if one or both of the ASIDs are not valid and terminate the command (decision block 80, "no" leg and block 82). Additionally, in an embodiment, the PPL 40 may implement limits on address space nesting. Any set of limits may be applied. For example, a predefined address range for nesting may be defined (e.g. during secure boot, or as part of the configuration of the PPL 40 installed on the system) and the range of virtual addresses specified for nesting may be checked to ensure it is within the predefined address range. As another example, the PPL 40 may limit the number of nested address spaces within an address space (e.g. to one, or another predefined number), and may generate an error if the nest address space command would exceed the permissible number of nested address spaces. If the nesting limits would be violated by the nest address space command (decision block 84, "yes" leg), the PPL 40 may return an error response and terminate the command (block 82).

If the ASIDs are valid and the nesting limits are not violated (decision block 80, "yes" leg and decision block 84, "no" leg), the PPL 40 may record an indication of the nesting in the PPL tracking data structures 50 (block 86). For example, the destination virtual addresses may be recorded for the destination address space as nested. The source virtual addresses may also be recorded as nested for the source address space, in an embodiment. The PPL 40 may also map the destination virtual addresses specified in the nest address space command to the same physical pages as the source virtual addresses (block 88). That is, the PPL 40 may read the source page table to obtain the physical addresses to which the source virtual addresses are mapped and may create mappings in the destination page table for each corresponding destination virtual addresses. The same permissions may be provided in the destination address space as those in the source virtual address space. Alternatively, more restrictive permissions may be applied (e.g. read-only, or read and executable if the source virtual page is executable). The PPL 40 may return a success response to the nest address space command and terminate the command (block 90).

Figures 6, 7:
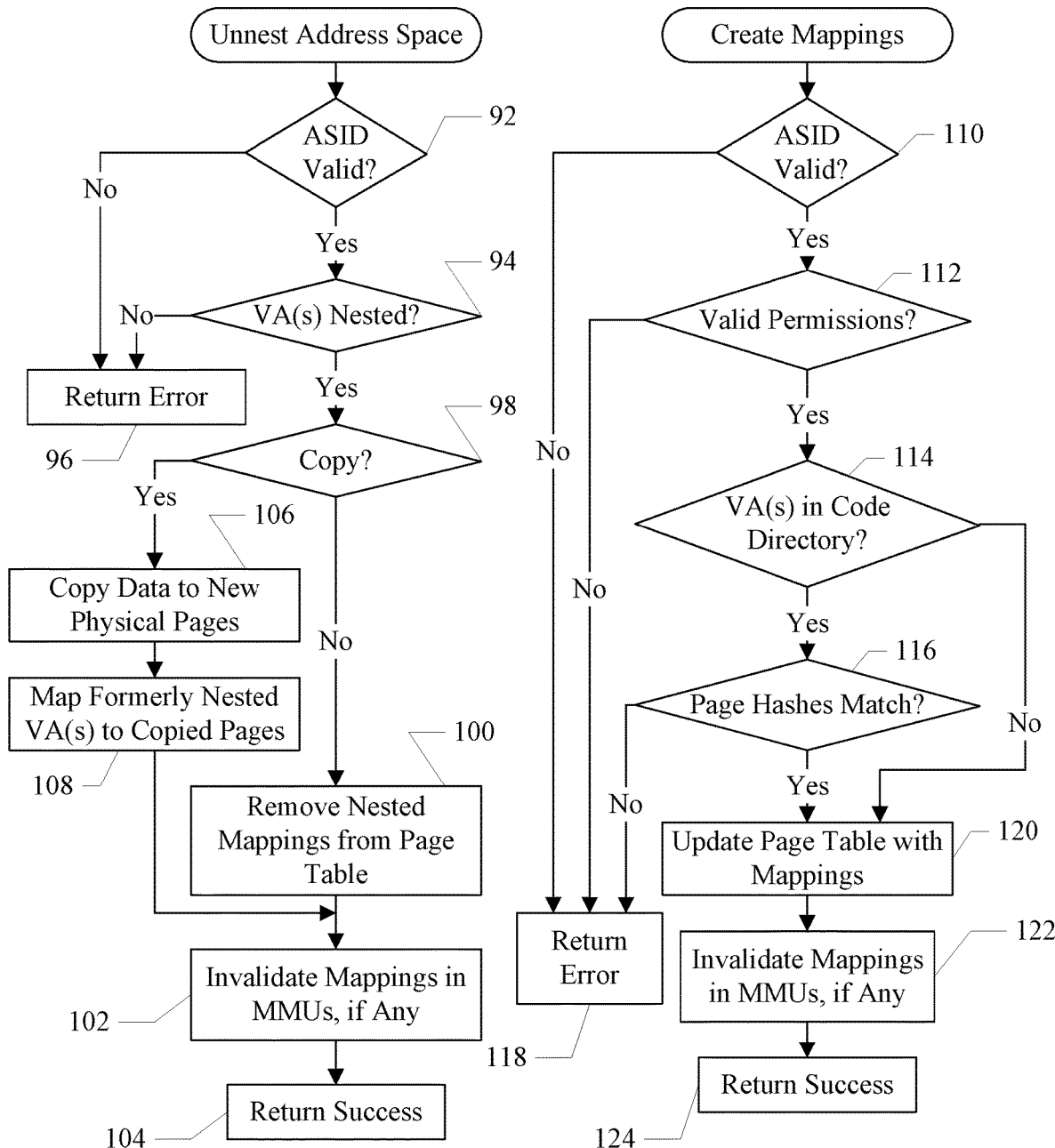
FIG. 6 is a flowchart illustrating operation of one embodiment of the PPL for an unnest address space command.
FIG. 7 is a flowchart illustrating operation of one embodiment of the PPL for a create mapping command.

The VM kernel 38A may determine that a previously-nested address space is to be unnested, and may use the unnest address space command to do so. FIG. 6 illustrates the operation of one embodiment of the PPL 40 for the unnest address space command. The unnest command may specify the ASID of the address space to be unnested and an indication of the address range to be unnested. For example, the unnest command may specify the virtual address at which the unnesting is to begin and the number of pages to unnest. Alternatively, start and end virtual addresses of the range to unnest may be specified. In one embodiment, the PPL 40 may support the creation of a local copy of the pages being unnested, although other embodiments may not support such an option. If the option is supported, the unnest command may include an indication of whether or not the local copy should be created.

The PPL 40 may check if the ASID is valid and may also check if the virtual addresses that are being unnested are actually currently nested (decision blocks 92 and 94). If the ASID is invalid (decision block 92, "no" leg) or one or more of the virtual addresses are not nested (decision block 94, "no" leg), the PPL 40 may return an error response to the VM kernel 38A and terminate the command (block 96). If the checks pass (decision blocks 92 and 94, "yes" legs), and the copy option is not selected (decision block 98, "no" leg), the PPL 40 may remove the virtual addresses from the ASID's page table (block 100). If the mappings are currently copied in one or more MMUs (e.g. in a TLB or the like), the PPL 40 may invalidate the mappings in the MMUs (block 102). The PPL 40 may issue TLB invalidate instructions, for example, to ensure that the mappings have been invalidated. In one embodiment, the TLB invalidate instructions (and other instructions that affect the MMU) may be restricted to execution in the PPL 40. The PPL 40 may return a success response to the VM kernel 38A and terminate the command (block 104).

For embodiments that support the copy option and the copy option is specified (decision block 98, "yes" leg), the PPL 40 may copy data from the source physical pages to newly-allocated physical pages (block 106). The VM kernel 38A may provide physical pages to be used, in an embodiment. In an embodiment, the VM kernel 38A may also be responsible for performing the copy to the newly-allocated physical pages, in which case block 106 may be eliminated. The PPL 40 may also modify the page table to map the formerly-nested virtual addresses to the newly-allocated physical pages (block 108). The PPL 40 may ensure that the previous mappings are invalidated in the MMUs (block 102) and return a success response to the VM kernel 38A and terminate the command (block 104).

The create mappings command may be used to create one or more mappings from virtual addresses to physical addresses. As previously discussed, the VM kernel 38A may be responsible for determining which virtual addresses are to be mapped to which physical addresses. The VM kernel 38A may use the create mappings command to have the mappings installed in the page table associated with a process' address space. The create mappings command may include the ASID of the address space in which the mappings are to be created, and an indication of the virtual addresses and the physical addresses to which the virtual addresses are to be mapped. For example, in one embodiment, the create mappings command may be used to map one or more consecutive virtual pages. In such an embodiment, the indication may be a number of pages, a virtual address at which the mappings are to start, and a pointer to a list of physical page addresses to which the mappings are to be made. The physical page addresses may be listed in the order in which they are to be mapped to consecutive virtual pages beginning at the specified virtual address. Alternatively, a list of virtual addresses and physical addresses may be used as the indication, to permit mapping of multiple disjoint virtual addresses with one create mappings command. The create mappings command may also include a set of permissions to be assigned to the pages. The pages in one create mappings command may use the same permissions, or separate permissions may be supplied for each page to be mapped. FIG. 7 is a flowchart illustrating operation of one embodiment of the PPL 40 in response to the create mappings command.

Checks for the create mappings command including checking that the ASID is valid (decision block 110), checking that the permissions are valid (decision block 112), and checking for page hash matches for pages that include code (decision blocks 114 and 116). If the ASID is not valid (decision block 110, "no" leg), the permissions are not valid (decision block 112, "no" leg), or the page hash for a page that includes code does not match the page has for the corresponding page in the code directory (decision block 114, "yes" leg and decision block 116, "no" leg), the PPL 40 may return an error response to the VM kernel 38A and terminate the command (block 118).

The combinations of permissions that may be viewed as invalid may depend on the security policies being enforced by the PPL 40. For example, one policy may be that pages which include code may not be writeable from any process' address space (subject to the JIT/debug exceptions described in further detail below). The permissions may not be valid, in such an embodiment, if the write permission is attempted and the page also has execute permission (either in the address space associated with the ASID, or in a different address space that is also mapped to the same physical page as tracked in the PPL tracking data structures 50). Similarly, if the execute permission is attempted and the physical page has write permission (either in the address space associate with the ASID or in a different address space that is also mapped to the same physical page as tracked in the PPL tracking data structures 50), the execute permission may not be valid.

For pages which contain code, the PPL 40 may ensure that the page hash generated over the code is correct (that is, the PPL 40 may hash the contents of the page or the portion thereof that contains code, and compare the result to the page hash previously provided for the page in the code directory). In one embodiment, a code directory may be provided for each address space, specifying the valid range of addresses that are permitted to contain code and the code signature for each page. Additional details are discussed below with respect to the associate code directory command and the register/unregister code directory commands. If the virtual addresses being mapped are not in the code directory (decision block 114, "no" leg), the page hash check may not be performed. If one or more virtual addresses are in the code directory (decision block 114, "yes" leg), and the page has comparison for the hash of the corresponding physical page and the hash for the page in the code directory does not match (decision block 116, "no" leg), the PPL 40 may return the error response to the VM kernel 38A and terminate the command (block 118). It is noted that the page hash check may be performed for addresses in the code directory even if the mapping is being made without the execute permission. In other embodiments, the checking of the VA(s) against the code directory and validating the page hash(es) of the code in the physical pages may be performed at a different point, e.g. when the code is loaded into the physical page in response to a page fault. In such embodiments, blocks 114 and 116 may be deleted.

In an embodiment, the create mappings command may be used to initial create mappings and to modify existing mappings. In one embodiment, if the create mappings command is creating initial mappings, the mappings may not be made executable. Thus, the permissions check (decision block 112) may include a check to ensure that the execute permission is not specified for an initial mapping. Subsequently, a create mappings command may be used to update the initial mapping and the execute permission may be permitted.

If the ASID is valid (decision block 110, "yes" leg), the permissions are valid (decision block 112, "yes" leg), and the virtual addresses are either not in the code directory (decision block 114, "no" leg) or the page hashes match (decision block 116, "yes" leg), the PPL 40 may update the page table with the requested mappings (block 120). The PPL 40 may also ensure that any previous mappings for the virtual addresses being mapped are invalidated in the MMUs, if any (block 122). The PPL 40 may return the success response to the VM kernel 38A and terminate the command (block 124).

Generally, code signing may refer to a protection mechanism for code that may be executed on a processor in the system. A code signature may be generated from the code (e.g. by the entity which sources the code), based on the contents of the code at the time the code is created. The code signature may be supplied with the code, and may be used to subsequently verify that the code is still the same as it was when created by the entity. For example, a cryptographic operation such as a hash may be applied to the code to generate a code signature. The hash may use a cryptographic key assigned to the entity. If, at a given point in time, the hash is repeated on the contents of a page that is designated as code, the hash should match the code signature if the contents have not been modified. Thus, code signing is a mechanism to detect invalid modification of code.

The remove mappings command may be used by the VM kernel 38A to remove one or more mappings from an address space. Such a command may be used if the VM kernel 38A is preparing to use the physical pages for a different mapping, for example. Also, the remove mappings command may be used to remove mappings for a process that is terminating, has crashed, etc. The remove mappings command may be used if the process no longer requires the pages (e.g. the process may be able to release the pages to the VM kernel 38A). FIG. 8 is a flowchart illustrating operation of one embodiment of the PPL 40 in response to a remove mappings command.

The remove mappings command may specify the ASID of the address space from which the mappings are to be removed, along with an indication of the mappings to be removed. For example, the indication may be a virtual address and a number of pages beginning at the virtual address for which mappings are to be removed. The indication may be a start virtual address and end virtual address for the range. A list of virtual addresses may be provided to permit the removal of mappings for disjoint virtual addresses.

If the ASID is not valid (decision block 126, "no" leg), the PPL 40 may return an error response to the VM kernel 38A and terminate the command (block 128). Other checks may be implemented as well, in some embodiments. For example, an address space may have an associated bounds that is tracked by the PPL 40, and if any of the specified virtual addresses is out of bounds, the PPL 40 may return an error response. If any of the specified virtual addresses are not valid current mappings, an error response may be provided.

If the ASID is valid (decision block 126, "yes" leg), the PPL 40 may update the page table to remove the mappings (block 130) and may ensure that any corresponding copies of the mappings that might be in an MMU (e.g. in a TLB) are also invalidated (block 132). The PPL 40 may return a success response to the VM kernel 38A and terminate the command (block 134). In one embodiment, removing the mappings in the page table may include clearing a valid bit for the mapping, so that a page fault would occur in the MMUs if the virtual address is used again in the address space. Other embodiments may overwrite the page table entry (e.g. with zeros) to remove a record of the previous mapping from the page table.

In an embodiment, the PPL 40 may support an increase (further restriction) of a page or pages using the protect mappings command. The protect mappings command may be similar to the create mappings command, but fewer checks may be needed which may permit a more rapid completion of the command in an embodiment. FIG. 9 is a flowchart illustrating operation of one embodiment of the PPL 40 in response to a protect mappings command.

The protect mappings command may specify the ASID of the address space from which the mappings are to be modified, along with an indication of the mappings. For example, the indication may be a virtual address and a number of pages beginning at the virtual address for which mappings are to be protected. The indication may be a start virtual address and end virtual address for the range. A list of virtual addresses may be provided to permit the removal of mappings for disjoint virtual addresses. The protect mappings command may further specify the permissions to be applied.

If the ASID is not valid (decision block 136, "no" leg), the PPL 40 may return an error response to the VM kernel and terminate the command (block 140). In the illustrated embodiment, if the permissions are not more restrictive than the current permissions (decision block 138, "no" leg), the PPL 40 may return a success response to the VM kernel without performing the command, effectively ignoring the command. In other embodiments, if the permissions are not more restrictive than the current permissions, the PPL 40 may return an error response and terminate the command. Permissions may be viewed as more strict if the permissions remove previously permitted actions. For example, the permissions may include read, write, and execute permissions. Making a readable page non-readable, a writeable page non-writeable, or an executable page non-executable would be making a permission more strict. However, making a non-writeable page writeable may not be permitted (even if one of the other permissions is being made more strict). Generally, if the permissions requested by the protect mappings command attempt to make the permissions less strict in any way (e.g. granting a permission that is not currently granted), the PPL 40 may not perform the permissions update (e.g. ignoring the command or returning error, in various embodiments).

If the ASID is valid (decision block 136, "yes" leg) and the permissions are more strict than current permissions (decision block 138, "yes" leg), the PPL 40 may update the page table to modify the permissions in the mappings (block 142) and may ensure that any copies of the previous mappings in the MMUs are invalidated (block 144). The PPL 40 may return a success response to the VM kernel 38A and terminate the command (block 146).

In one embodiment, a protect page command may also be supported, which may operate similar to the protect mappings command, but which may be applied to a physical page. The PPL 40 may check the ASID and locate the mapping in the page table, then ensure that the permissions are more strict. If the checks pass, the PPL 40 may modify the mapping, invalidate any previous copies of the mapping in the MMUs, and return a success response.

The VM kernel 38A may use the activate address space command to activate an address space on a processor (e.g. one of the CPUs 10). The activate address space command may be used when a process is scheduled to execute on the CPU 10, for example. FIG. 10 is a flowchart illustration operation of one embodiment of the PPL 40 in response to the activate address space command.

If the ASID for the address space in not valid, the PPL 40 may return an error response and terminate the command (decision block 148, "no" leg and block 150). Otherwise (decision block 148, "yes" leg), the PPL 40 may invalidate the MMU 12 of the CPU 10 (since the mappings in the MMU 12 are for the previously activate address space on the CPU 10, if any) (block 152). Alternatively, since the MMU 12 checks the ASID against any cached mappings before using the mappings, the invalidation of the MMU 12 may not be required and block 152 may be removed. The PPL 40 may program the MMU 12 to use the address space (block 154). For example, the PPL 40 may program the MMU 12 with the ASID, the base address of the page table for the address space, extent of the page table, etc. The PPL 40 may return a success response to the VM kernel 38A and terminate the command (block 156).

As mentioned previously, the VM kernel 38A may define one or more regions in an address space that contain code, and may provide a code directory with code signatures for the pages in the region(s). In one embodiment, the kernel 38 may require that one contiguous segment of an address space be defined as containing code. The segment may begin at any offset within a virtual page. The segment may be contained within the page, or may continue over any number of contiguous virtual pages to a terminating virtual page. The code segment may also terminate at any offset within the termination virtual page, in an embodiment. The code directory may define the segment and may include the code signature for each page in the segment.

Figure 17:
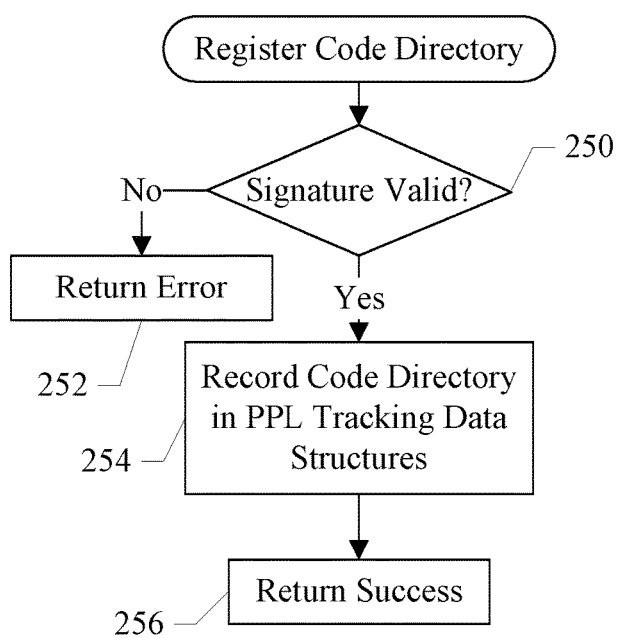
FIG. 17 is a flowchart illustrating operation of one embodiment of the PPL for a register code directory command.

The VM Kernel 38A may register a code directory with the PPL 40, so that it may be subsequently associated with one or more address spaces. The register code directory command may be used to register the code directory. Operation of one embodiment of the PPL 40 in response to the register code directory command is illustrated in the flowchart of FIG. 17. In response to the register code directory command, the PPL 40 may validate the signature associated with the code directory. The code directory may be checked against its signature and may not be valid if the signature does not match, or if the size of the virtual address range to which the code directory is to be associated does not match the size of the code directory. If the code directory signature checks fail (decision block 250, "no" leg), the PPL 40 may return an error response to the VM directory 38A and terminate the command (block 252). Otherwise, the PPL 40 may record the code directory and related data (e.g. the page hashes for the pages that contain code) in the PPL tracking data structures 50 (block 254). The code directory is then available for association with address spaces.

Figures 11, 12:
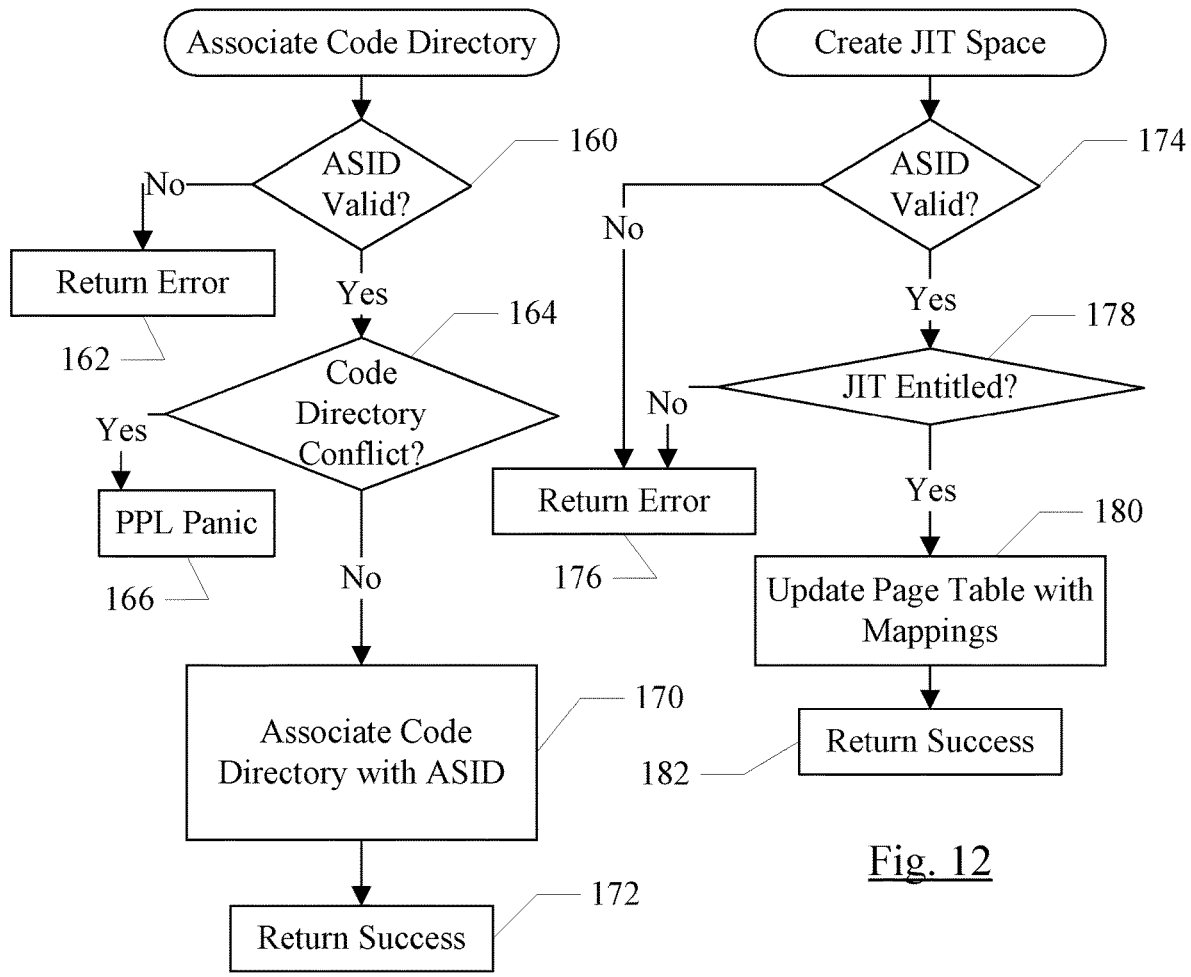
FIG. 11 is a flowchart illustrating operation of one embodiment of the PPL for an associate code directory command.
FIG. 12 is a flowchart illustrating operation of one embodiment of the PPL for a create JIT space command.

The VM kernel 38A may associate a code directory with an address space using the associate code directory command. Operation of one embodiment of the PPL 40 in response to the associate code directory command is illustrated in the flowchart of FIG. 11. The associate directory command may include the ASID of the address space that the code directory is being associated with, an indication of the code directory, and an indication of the virtual address range to be associated with the code directory (e.g. a base virtual address and size, a start and end virtual address, etc.).

The PPL 40 may check the ASID for validity (decision block 160), and may return an error response if the ASID is not valid and terminate the command (decision block 160, "no" leg and block 162). The PPL 40 may also check for a code directory conflict (decision block 164). In one embodiment, only one main code directory may be specified, and one library code directory may be specified (e.g. for nested address spaces as previously discussed). A conflict may be detected if a code directory is a main code directory and the address space already has a main code directory association; a library code directory is specified and there is no main code directory association or there is already a library code directory association; or the library code directory and the main code directory overlap. Code directory conflicts may be treated as a serious error and may thus cause a panic in the PPL 40 (which may cause the system to crash, for example) (decision block 164, "yes" leg and block 166).

If there is no code directory conflict (decision block 164, "no" leg), the PPL 40 may associate the code directory with the ASID in the PPL tracking data structure 50 (block 170). The PPL 40 may return a success response to the VM kernel 38A and terminate the command (block 172).

Since creating code directory conflicts are a serious error, the PPL 40 may also support commands to query the association of an address space with a code directory. For example, a lookup command may be supported which permits the VM kernel 38A to query an address range and receive the code directory associated with the address range (if any). The PPL 40 may also support a check overlap command to determine if a virtual address range overlaps with an existing code directory.

Figure 18:
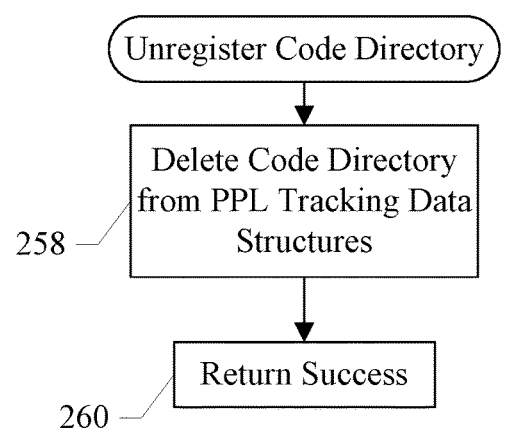
FIG. 18 is a flowchart illustrating operation of one embodiment of the PPL for an unregister code directory command.

In an embodiment, if all the ASIDs that have previously been associated with a code directory have been eliminated (e.g. the corresponding processes have termination) and the code underlying the code directory is to be removed, the code directory may be unregistered with the PPL 40 to free the resources (e.g. PPL tracking data structure 50 space) consumed by the code directory. FIG. 18 is a flowchart illustrating operation of one embodiment of the PPL 40 in response to an unregister code directory command. The PPL 40 may delete the code directory (and any corresponding metadata) from the PPL tracking data structures 50 (block 258) and may return success (block 260). In an embodiment, the PPL 40 may check that the code directory is actually registered with the PPL 40, and may return an error if it is not registered. In other embodiments, the PPL 40 may simply return success without modifying the PPL tracking data structures 50 if the code directory is not registered.

As mentioned previously, some processes may support a JIT region. For example, web browsers which permit Java compilation into executable code may compile the code, writing it into the JIT region. The region may be changed to executable, and may be executed. To support such activity, the PPL 40 may permit a JIT region to be defined in an address space which may be changed from read/write permission to read/execute position. The PPL 40 may not permit both write and execute permissions to be concurrently on. The create JIT space command may be used to define the address space in which JIT is permitted. In one embodiment, the ability to create JIT space may be controlled by an entitlement assigned to a given application. The entitlement may not be modified on the system. In one embodiment, the entitlement may be part of the code directory associated with the address space.

FIG. 12 is a flowchart illustrating operation of one embodiment of the PPL 40 in response to a create JIT space command. The PPL 40 may determine if the ASID provided with the command is valid and may return an error response if the ASID is not valid and terminate the command (decision block 174, "no" leg and block 176). Additionally, the PPL 40 may check the entitlements in the address space's associated code directory, and if the code is not JIT-entitled (decision block 178, "no" leg), the PPL 40 may return an error response and terminate the command (block 176). If the code is JIT entitled, the PPL 40 may update the page table with mappings to the JIT page or pages, and may return a success response to the VM kernel 38A and terminate the command (blocks 180 and 182). The PPL 40 may also record an indication of the JIT region in the PPL tracking data structures 50, so that subsequent toggling between write and execute permission within the JIT region may be permitted.

A similar command to the create JIT space may be supported for debugging. The code may be required to have an entitlement that permits debugging, and the address space to be debugged may be defined similar to the JIT region. The permissions in the defined region may be permitted to change between read/write and read/execute to permit the debugger to insert breakpoints and other debug options.

The take working memory command may be used by the VM kernel 38A to provide physical pages to the PPL 40. The command may include a list of physical pages that the PPL 40 may use. The PPL 40 may use the pages for the PPL tracking data structures 50 and/or other working memory locations. The reclaim working memory command may be used by the VM kernel 38A to reclaim physical pages that were previously provided to the PPL 40 for its use. The PPL 40 may attempt to release the requested pages, but may retain pages to ensure that it has enough working memory to continue operating.

The PPL 40 may also control operation for IOMMU access. Similar to memory mapping, IOMMU mappings may control access of a peripheral device to the memory 52, even though the peripheral device may not be a processor.

Figures 13, 14:
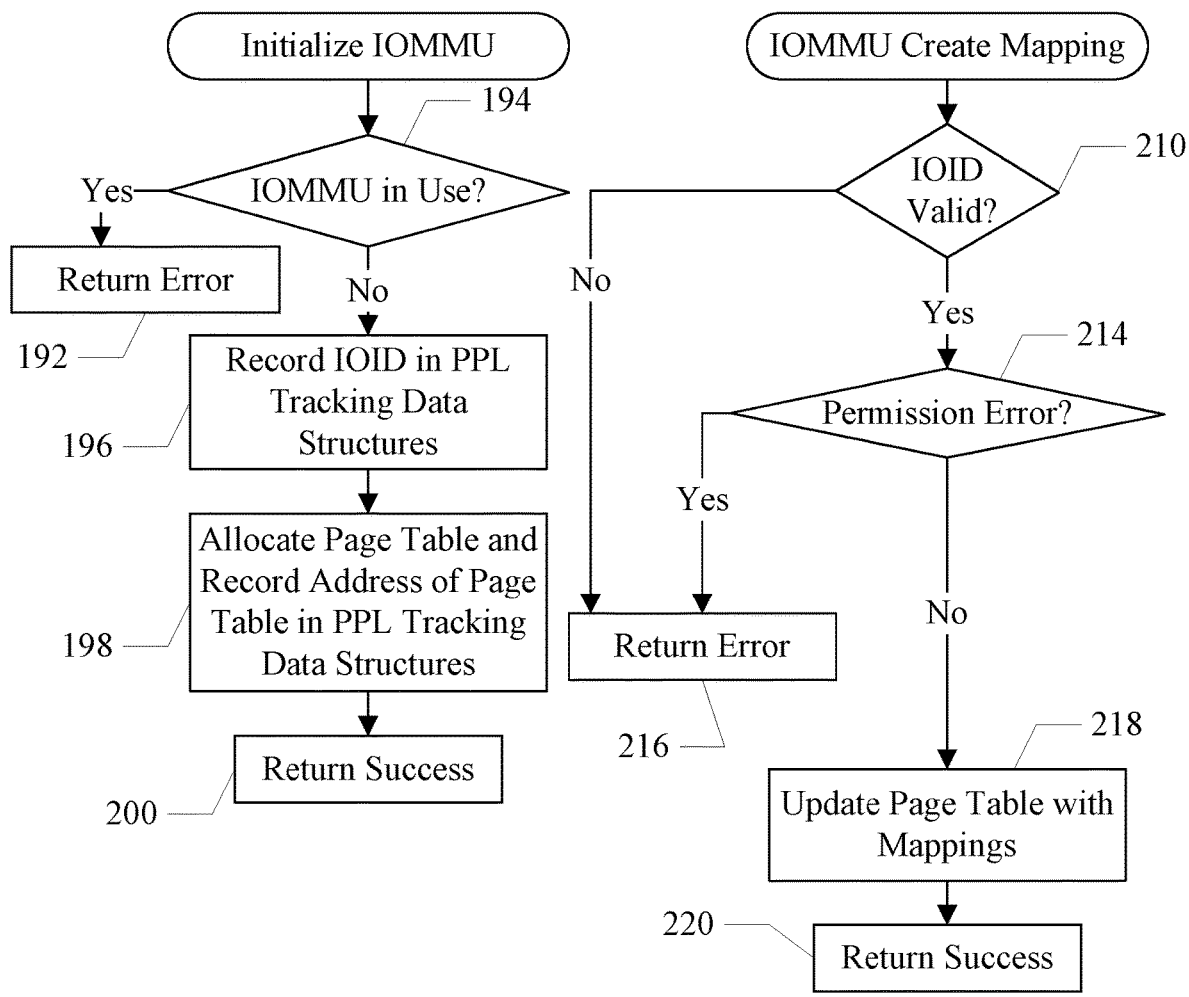
FIG. 13 is a flowchart illustrating operation of one embodiment of the PPL for an initialize input/output MMU (IOMMU) command.
FIG. 14 is a flowchart illustrating operation of one embodiment of the PPL for an IOMMU create mapping command.

The VM kernel 38A may use the initialize IOMMU command to create an IOMMU address space. FIG. 13 is a flowchart illustrating operation of one embodiment of the PPL 40 in response to the initialize IOMMU command. In an embodiment, the PPL 40 may assign an IOMMU ID (IOID) to a peripheral (and thus the corresponding IOMMU), and may return the IOID to the VM kernel in response to a successful initialize IOMMU command. In other embodiments, the VM kernel 38A may provide an IOMMU ID (IOID), which may identify a peripheral (and thus the corresponding IOMMU) in a manner similar to the ASID identifying an address space.

If the IOMMU that the VM kernel 38A is attempting to initialize is already in use (e.g. the pages are already mapped in the PPL 40), the PPL 40 may return an error response and terminate the command (decision block 194, "yes" leg, and block 192). Otherwise (decision block 194, "no" leg), the PPL 40 may record the IOID in the PPL tracking data structures 50 and may allocate a page table for the IOMMU and may record the address of the page table in the PPL tracking data structures 50 (blocks 196 and 198). In one embodiment, the page table may be allocated from the page tables 48.

Alternatively, the IOMMU page table may be placed in a separate memory location, as the IOMMU page tables may be defined differently from memory page tables. The PPL 40 may program the IOMMU with the address of the page table. The PPL 40 may return success to the VM kernel 38A (along with the IOID) and terminate the command (block 200).

The VM kernel 38A may create mappings in the IOMMU page table using the IOMMU create mapping command. The IOMMU create mapping command may include the IOID for the IOMMU, and an indication of the virtual addresses and the physical addresses to which the virtual addresses are to be mapped. For example, in one embodiment, the IOMMU create mapping command may be used to map one or more consecutive virtual pages. In such an embodiment, the indication may be a number of pages, a virtual address at which the mappings are to start, and a pointer to a list of physical page addresses to which the mappings are to be made. The physical page addresses may be listed in the order in which they are to be mapped to consecutive virtual pages beginning at the specified virtual address. Alternatively, a list of virtual addresses and physical addresses may be used as the indication, to permit mapping of multiple disjoint virtual addresses with one IOMMU create mappings command. The IOMMU create mappings command may also include a set of permissions to be assigned to the pages. The pages in one create mappings command may use the same permissions, or separate permissions may be supplied for each page to be mapped. The IOMMU create mapping command may also support subregions within a page (e.g. the registers mapped to a given page may not fill the page, and thus there may be no accessible data in part of the page). FIG. 14 is a flowchart illustrating operation of one embodiment of the PPL 40 in response to the IOMMU create mappings command.

Checks for the IOMMU create mappings command including checking that the IOID is valid (decision block 210) and checking that the permissions are valid (decision block 214). If the IOID is not valid (decision block 210, "no" leg) or the permissions are not valid (decision block 214, "yes" leg), the PPL 40 may return an error response to the VM kernel 38A and terminate the command (block 216).

If none of the above apply (decision block 210, "yes" leg and decision block 214, "no" leg), the PPL 40 may update the page table with the requested mappings (block 218) and may return a success message to the VM kernel 38A and terminate the command (block 220).

Figure 15:
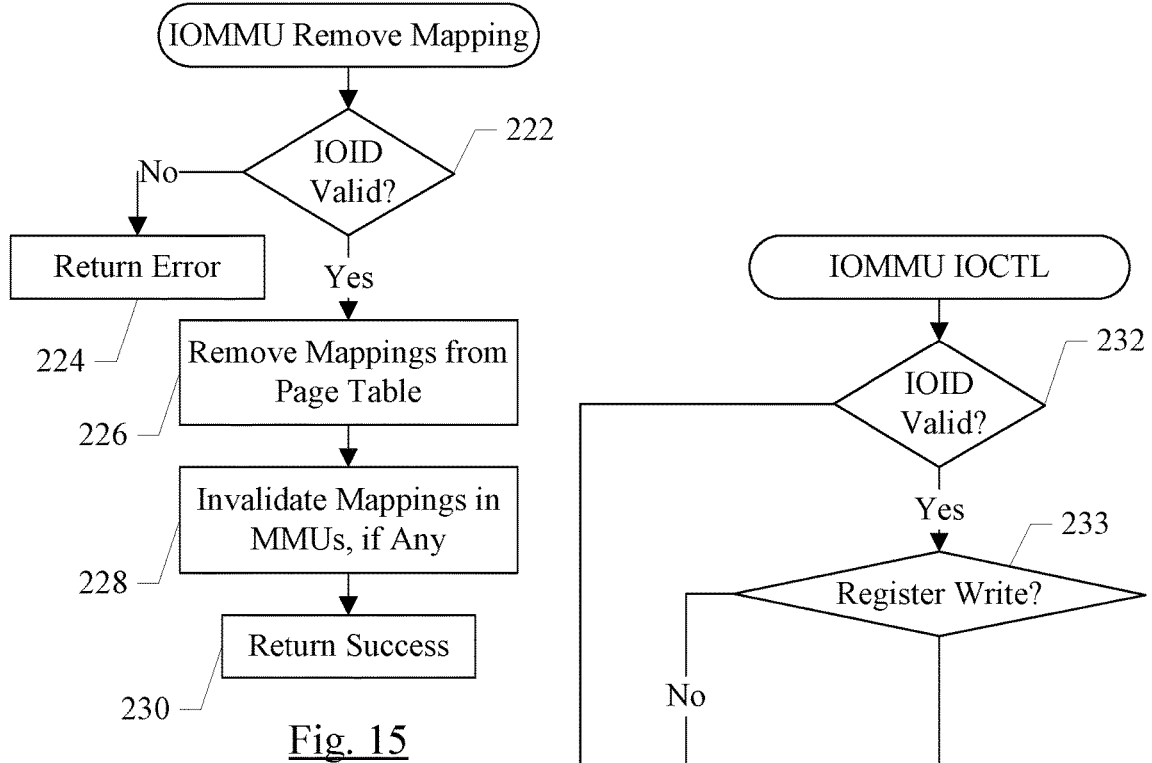
FIG. 15 is a flowchart illustrating operation of one embodiment of the PPL for an IOMMU remove mapping command.

The VM kernel 28A may remove mappings for the IOMMU page table using the IOMMU remove mappings command. FIG. 15 is a flowchart illustrating operation of one embodiment of the PPL 40 in response to an IOMMU remove mappings command.

The remove mappings command may specify the IOID of the IOMMU from which the mappings are to be removed, along with an indication of the mappings to be removed. For example, the indication may be a virtual address and a number of pages beginning at the virtual address for which mappings are to be removed. The indication may be a start virtual address and end virtual address for the range. A list of virtual addresses may be provided to permit the removal of mappings for disjoint virtual addresses.

If the IOID is not valid (decision block 222, "no" leg), the PPL 40 may return an error response to the VM kernel 38A and terminate the command (block 224). If the IOID is valid (decision block 222, "yes" leg), the PPL 40 may update the page table to remove the mappings (block 226) and may ensure that any corresponding copies of the mappings that might be in the IOMMU are also invalidated (block 228). The PPL 40 may return a success response to the VM kernel 38A and terminate the command (block 230). In one embodiment, removing the mappings in the page table may include clearing a valid bit for the mapping, so that a page fault would occur in the MMUs if the virtual address is used again in the address space. Other embodiments may overwrite the page table entry (e.g. with zeros) to remove a record of the previous mapping from the page table.

Figure 16:
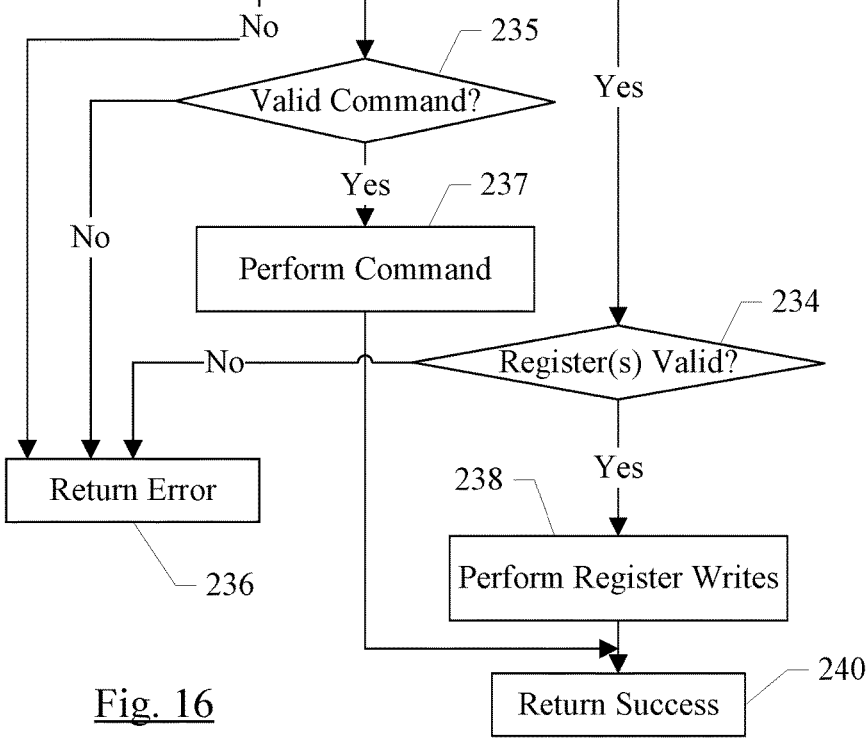
FIG. 16 is a flowchart illustrating operation of one embodiment of the PPL for an IOMMU IOCTL command.

Some peripherals may support memory-mapped IO, which may permit communication from a processor or other system component to a peripheral (e.g. to write registers in the peripheral). In one embodiment, the PPL 40 may be the only component in the system that is permitted to write to MMIO pages (and thus to write peripheral registers that are mapped into the MMIO pages). Accordingly, the kernel 38 may request writes to IOMMU pages via the PPL 40, and similarly any processes that the kernel 38 permits to perform such writes may also request writes via the PPL 40. Additionally, other I/O control commands may be performed via requests to the PPL 40 (e.g. various operations that cause a peripheral to perform a specific action). FIG. 16 is a flowchart illustrated operation of one embodiment of the PPL 40 in response to an IOMMU IOCTL command from the kernel 38.

The IOMMU IOCTL command may include the IOID, as well as an indication of the command. In the case that the command is a register write command, the command may include an indication of which registers to write. The indication may be, e.g., a list of registers and the values to write to those registers. The PPL 40 may check that the IOID is valid, determine the type of IOCTL command, and for a write registers command may also verify that the registers that are listed in the command are valid registers (decision blocks 232, 233 and 234, respectively). In an embodiment, some registers may not be writeable from the kernel 38 (e.g. the register that points to the page table for the IOMMU, for example). If the IOID is invalid (decision block 232, "no" leg) the PPL 40 may return an error response and terminate the command (block 236). If the command is a register write command (decision block 233, "yes" leg), and the list of registers is not valid (decision block 234, "no" leg), the PPL 40 may return an error response and terminate the command (block 236). On the other hand, if the command is a register write command (decision block 233, "yes" leg) and the list of registers is valid (decision block 234, "yes" leg), the PPL 40 may perform the register writes (block 238) and return a success message and terminate the command (block 240). If the command is another type of IOCTL command (decision block 233, "no" leg), the PPL 40 may validate the command and if the command is not a valid command for the peripheral (decision block 235, "no" leg), the PPL 40 may return an error response and terminate the command (block 236). If the command is another type of IOCTL command (decision block 233, "no" leg) and the command is a valid command for the peripheral (decision block 235, "yes" leg), the PPL 40 may perform the command (block 237) and return a success response and terminate the command (block 240).

MMIO reads may be permitted directly from the kernel 38, in an embodiment. In other embodiments, MMIO reads may be performed with an IOMMU IOCTL command to the PPL 40.

Figure 19:
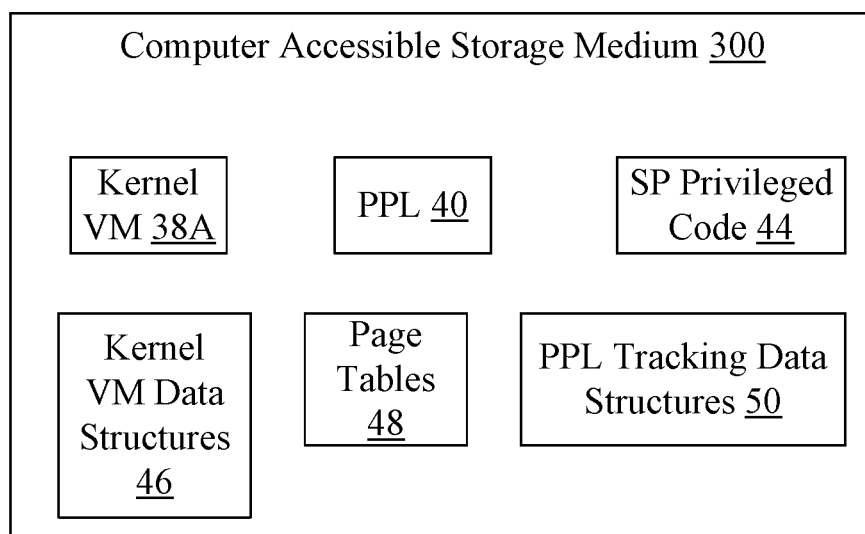
FIG. 19 is a block diagram of one embodiment of a computer accessible storage medium.

FIG. 19 is a block diagram of one embodiment of a computer accessible storage medium 300. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 300 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 300 in FIG. 19 may store code forming the kernel VM 38A (and/or the entire kernel 38), the PPL 40, the SP privileged code 44, etc. The computer accessible storage medium 300 may still further store one or more data structures such as the kernel VM data structures 46, the page tables 48, and/or the PPL tracking data structures 50. The kernel 38, the kernel VM 38A, the PPL 40, and the SP privileged code 44 may comprise instructions which, when executed, implement the operation described above for the respective code.

Numerous variations and modifications will become apparent to those skilled in the art once the above disclosure is fully appreciated. It is intended that the following claims be interpreted to embrace all such variations and modifications.

What is claimed is:

1. A non-transitory computer accessible storage medium storing a plurality of instructions which are computer-executable to cause a computer to implement:
    a kernel that controls virtual to physical page assignments in a virtual memory system; and
    a page protection layer that controls a content of page tables used by one or more processors in the computer for translation of virtual memory addresses to physical memory addresses, wherein the kernel transmits commands to the page protection layer to request updates to the page tables, wherein a given command includes a request to update the page tables with a virtual address of a virtual page and a physical address of a physical page assigned by the kernel to map to the virtual page, and
    wherein the page protection layer:
    determines whether or not the updates are permissible;
    prevents the updates that are not permissible, including preventing the update to the page tables with a mapping of the virtual address to the physical address for the given command based on a determination that the update is not permissible; and
    performs the updates that are permissible, including updating the page tables with the mapping of the virtual address to the physical address for the given command based on a determination that the update is permissible.

2. The non-transitory computer accessible storage medium as recited in claim 1 wherein the commands are transactions that are either terminated with an error or completed in their entirety.

3. The non-transitory computer accessible storage medium as recited in claim 1 wherein the page protection layer enforces one or more security policies for mappings in the page tables.

4. The non-transitory computer accessible storage medium as recited in claim 3 wherein the one or more security policies include ensuring that the page protection layer is an only component in the computer that is able to modify the page tables.

5. The non-transitory computer accessible storage medium as recited in claim 3 wherein the one or more security policies include ensuring that no component in the computer is able to modify a page that is marked executable in any address space.

6. The non-transitory computer accessible storage medium as recited in claim 3 wherein the one or more security policies include ensuring that any page that is marked executable has code with a verified code signature.

7. The non-transitory computer accessible storage medium as recited in claim 1 wherein the page protection layer is included in a trusted computing base of the computer and the kernel is external to the trusted computing base.

8. The non-transitory computer accessible storage medium as recited in claim 1 wherein the computer includes one or more memory management units, and wherein the page protection layer is an only component in the computer that controls the memory management units.

9. A system comprising:
    one or more central processing units (CPUs), each of the one or more CPUs comprising a memory management unit (MMU); and
    a memory controller coupled to the one or CPUs and coupled to a memory during use, wherein the memory stores, during use, a plurality of instructions which are executable by the one or more CPUs to cause the system to implement:
        a kernel that controls virtual to physical page assignments in a virtual memory system; and
        a page protection layer that controls a content of page tables used by the MMUs in the one or more CPUs in the system for translation of virtual memory addresses to physical memory addresses, wherein the kernel transmits commands to the page protection layer to request updates to the page tables, and wherein the page protection layer:
- determines whether or not the updates are permissible,
- prevents the updates that are not permissible, and performs the updates that are permissible; and
- wherein the commands include an activate address space command, and wherein the page protection layer programs a first MMU in a first CPU of the one or more CPUs to access an address space identified by the activate address space command.

10. The system as recited in claim 9 wherein the page protection layer invalidates a content of the first MMU prior to programming the first MMU.

11. The system as recited in claim 9 wherein the commands include a create address space command, and wherein the page protection layer allocates a first page table in response to the create address space command and associates the first page table with the address space specified by the create address space command.

12. The system as recited in claim 11 wherein the commands include commands to create mappings and remove mappings from the address space, and the page protection layer updates the first page table to create and remove mappings.

13. The system as recited in claim 12 wherein the page protection layer has a code directory that specifies virtual addresses of pages containing code and includes signatures for each page of code, and wherein the page protection layer validates code against the code directory prior to creating a mapping to a first page containing code, and wherein the page protection layer fails the create mapping command that attempts to map the first page responsive to the code not validating against the code directory.

14. The system as recited in claim 9 further comprising a first component that includes an input/output memory management unit (IOMMU), and the page protection layer manages mapping in a second page table used by the IOMMU.

15. The system as recited in claim 14 wherein the commands from the kernel to the page protection layer further include one or more input/output control (IOCTL) commands for the IOMMU.

16. The system as recited in claim 9 wherein the commands are transactions that are either terminated with an error or completed in their entirety.

17. The system as recited in claim 9 wherein the page protection layer enforces one or more security policies for mappings in the page tables, wherein the one or more security policies include:

- ensuring that the page protection layer is an only component in the system that is able to modify the page tables;
- ensuring that no component in the system is able to modify a page that is marked executable in any address space; and
- ensuring that any page that is marked executable has code with a verified code signature.

18. A method comprising:
- executing a kernel on one or more central processing units (CPUs) in a computer system, wherein the kernel controls virtual to physical page assignments in a virtual memory system; and
- executing a page protection layer on the one or more CPUs, wherein the page protection layer controls a content of page tables used by one or more processors in the computer system for translation of virtual memory addresses to physical memory addresses, wherein the kernel transmits commands to the page protection layer to request updates to the page tables, wherein a given command includes a request to update the page tables with a virtual address of a virtual page and a physical address of a physical page assigned by the kernel to map to the virtual page, and
- wherein the page protection layer:
  - determines whether or not the updates are permissible;
  - prevents the updates that are not permissible, including preventing the update to the page tables with a mapping of the virtual address to the physical address for the given command based on a determination that the update is not permissible; and
  - performs the updates that are permissible, including updating the page tables with the mapping of the virtual address to the physical address for the given command based on a determination that the update is permissible.

19. The method as recited in claim 18 wherein the commands are transactions that are either terminated with an error by the page protection layer or completed in their entirety by the page protection layer.

20. The method as recited in claim 18 wherein the commands include an activate address space command, and the method further comprises programming, by the page protection layer, a first MMU in a first CPU of the one or more CPUs to access an address space identified by the activate address space command.

* * * * *